United States Patent
Cox

[19]

[11] Patent Number: 6,088,174
[45] Date of Patent: Jul. 11, 2000

[54] LENS CAP APPARATUS FOR OPTICAL INSTRUMENT

[75] Inventor: Jon T. Cox, Riverton, Wyo.

[73] Assignee: The Brunton Company, Riverton, Wyo.

[21] Appl. No.: 09/261,662

[22] Filed: Mar. 3, 1999

[51] Int. Cl.[7] .................................................. G02B 7/02
[52] U.S. Cl. .......................................... 359/819; 359/822
[58] Field of Search .................................... 359/802, 811, 359/819, 822, 399, 404, 407; 2/434; 396/448

[56] References Cited

U.S. PATENT DOCUMENTS

| | | | |
|---|---|---|---|
| D. 98,185 | 1/1936 | Reynolds . | |
| 2,291,821 | 8/1942 | McNabb | 88/1 |
| 2,372,479 | 3/1945 | French | 88/1 |
| 3,020,802 | 2/1962 | Răutsch et al. | 88/34 |
| 3,698,791 | 10/1972 | Walchle et al. | 350/61 |
| 3,829,194 | 8/1974 | Van Exel et al. | 350/76 |
| 4,641,932 | 2/1987 | Harms | 350/587 |
| 4,865,191 | 9/1989 | Easter | 206/315.3 |
| 5,155,624 | 10/1992 | Flagler | 359/510 |
| 5,404,280 | 4/1995 | Greek et al. | 362/198 |
| 5,406,413 | 4/1995 | Mogamiya | 359/511 |

*Primary Examiner*—Ricky Mack
*Attorney, Agent, or Firm*—John E. Reilly

[57] ABSTRACT

A lens cap apparatus for an optical instrument adapted to shield a user's eyes from incident light from any direction. The lens cap apparatus is formed from an annular base with a pivotally connected lid and a connecting assembly for releasably securing the base to a cap-receiving end of a tubular member which houses a lens in an optical instrument. The connecting assembly permits rotation through 360° of the base and its pivotally connected lid in relation to the cap-receiving end of the optical instrument. This 360° rotation coupled with a greater than 180° pivotal movement of the lid in relation to the base gives the user maximum adjustability to shield the user's eyes from incident light from all possible angles. Additionally, the greater than 180° movement of the lid in relation to the base allows the user to adjust the lens cap apparatus to compensate for such variables as the width and shape of the user's head and can be used in conjunction with eye glasses.

16 Claims, 3 Drawing Sheets

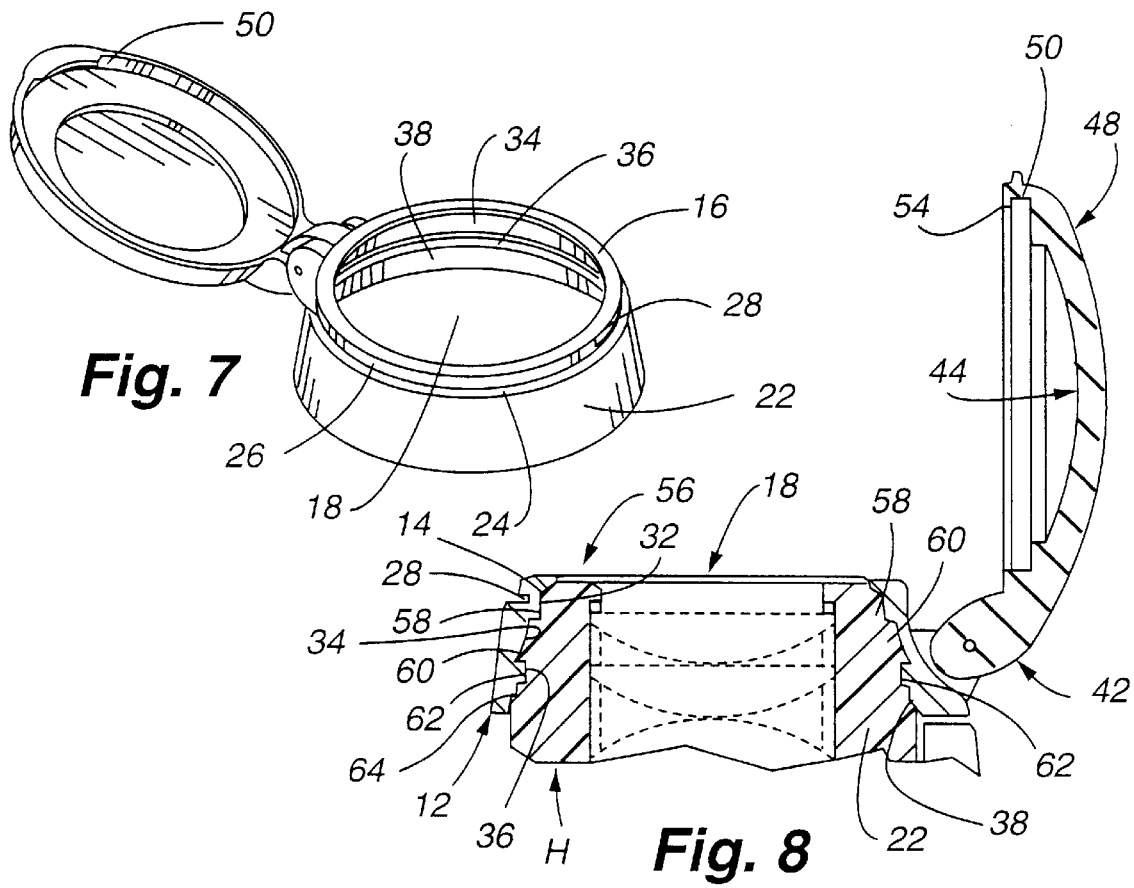
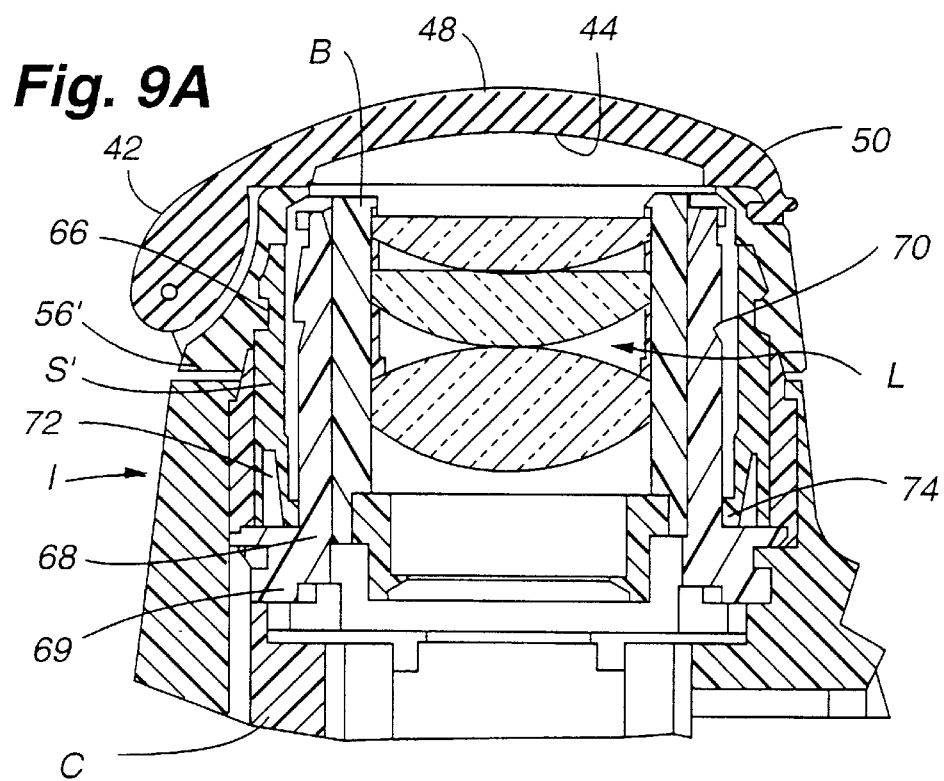

LENS CAP APPARATUS FOR OPTICAL INSTRUMENT

BACKGROUND AND FIELD OF THE INVENTION

This invention relates to lens caps for optical instruments; and more particularly relates to a novel and improved protective lens cap for shielding the user's eyes from incident light from any angle thereby enhancing the viewing quality of the optical instrument.

It is well known to provide a protective lens cap for an optical instrument to prevent the lens from being scratched or otherwise damaged. For example, U.S. Pat. No. 98,185, issued to Reynolds, discloses the design for a binocular telescope with hinged dust covers; U.S. Pat. No. 3,829,194, issued to Van Exel, discloses a binocular having a removable cover plate for protection of the objective and eyepiece lenses; U.S. Pat. No. 4,641,932, issued to Harms, discloses a slidable protective lens cap which is permanently attached for an optical device; U.S. Pat. No. 5,155,624, issued to Flagler, discloses a disposable protective lens cap having an optically clear portion for protection of the objective lens of a microscope which is used during surgery.

However, there has been little in regard to protective caps for lenses which have the additional feature of blocking incident light from the user's field of vision. Incident light may drastically reduce the image quality of objects viewed through an optical instrument, such as, a binocular, telescope, or microscope. In fact, a high amount of incident light may completely obstruct the image viewed through an optical instrument. Usually, a user will use his or her hands in an attempt to block this incident light and improve the image quality. However, it may be difficult for the user to block the incident light while maintaining a firm grip on the optical instrument. U.S. Pat. No. 3,020,802, issued to Rantsch, discloses the use of ocular rubber sleeves in combination with a cover such that the cover forms a certain protection against the lateral entrance of light when it is removed from the ocular lens. However, often the source of incident light penetrates the field of vision from angles other than the outside-lateral angle of the user, such as, from above the user or various other angles. This problem is especially critical for users in the field who encounter a vast number of different lighting situations.

It is therefore desirable to provide a lens cap apparatus that is capable of shielding the user's eyes from incident light from all angles; and when used in pairs on binoculars, are adjustable to fit varying widths and shapes of different people's heads, and can be used in conjunction with eye glasses.

SUMMARY OF THE INVENTION

It is therefore an object of the present invention to provide for a novel and improved protective lens cap apparatus for an optical instrument which is adapted to shield a user's eyes from incident light from any angle which may penetrate a user's field of view.

It is another object of the present invention to provide a novel and improved lens cap apparatus for an optical instrument which can be used by people with different sized heads, and by people who wear eyeglasses.

In accordance with the present invention, a novel and improved lens cap apparatus is adapted to be used with an optical instrument having a tubular member which houses a lens of the optical instrument. At least one end of the tubular member forms a cap-receiving end for connecting with the lens cap apparatus.

The lens cap apparatus is formed from an annular base disposed in journaled, surrounding relation to the cap-receiving end, and a lid is pivotally connected to the base which allows greater than 180° movement of the lid between an open and closed position with respect to the base. The lid is generally circular and has a diameter large enough to completely cover the base when the lid is in a closed position for protecting the lens when the optical instrument is not in use. Moreover, the lid is large enough to block incident light when the lid is in an open position.

A unique form of connecting means or assembly secures the base to the cap-receiving end and permits rotation through 360° of the base and lid with respect to the cap-receiving end. In this way, the lid is adjustable to shield a user's eyes from incident light from any direction.

The connecting assembly preferably consists of a series of complementary ridges and grooves located on an outer surface of the cap-receiving end and the inner surface of the base. The ridges and grooves of the base mate with the ridges and grooves of the cap-receiving end thereby connecting the base to the cap-receiving end. The generally circular shape of the base and cap-receiving end as well as the connection of the ridges and grooves permits the user to rotate the base, and its pivotally connected lid, about the cap-receiving end of the optical instrument.

In the first function, the 360° movement of the base in relation to the cap-receiving end coupled with the greater than 180° movement of the lid in relation to the base gives the user maximum adjustability of the lid for use in shielding the user's eyes from incident light from all possible angles.

In the second function, the greater than 180° movement of the lid allows the user to adjust the lens cap apparatus to compensate for such variables as whether the user is wearing eye glasses. For example, a user who wears eye glasses may open the lid farther to compensate for the space occupied by the glasses while still having the ability to block incident light from all angles. Additionally, when a pair of lens cap apparatuses are used in connection with binoculars, the greater than 180° movement of the lids provides adjustability depending upon the width and shape of the user's head.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 7 is a perspective view of the lid and base of the preferred form of lens cap apparatus shown with the lid in an open position;

FIG. 8 is a cross sectional view taken along lines 8—8 of FIG. 3 showing a first form of mounting on an adjustable sleeve which is in the retracted position;

FIG. 9A is a cross sectional view along line 9—9 of FIG. 6 showing an alternative mounting of the present invention;

DETAILED DESCRIPTION OF PREFERRED EMBODIMENT

Figure 9B:
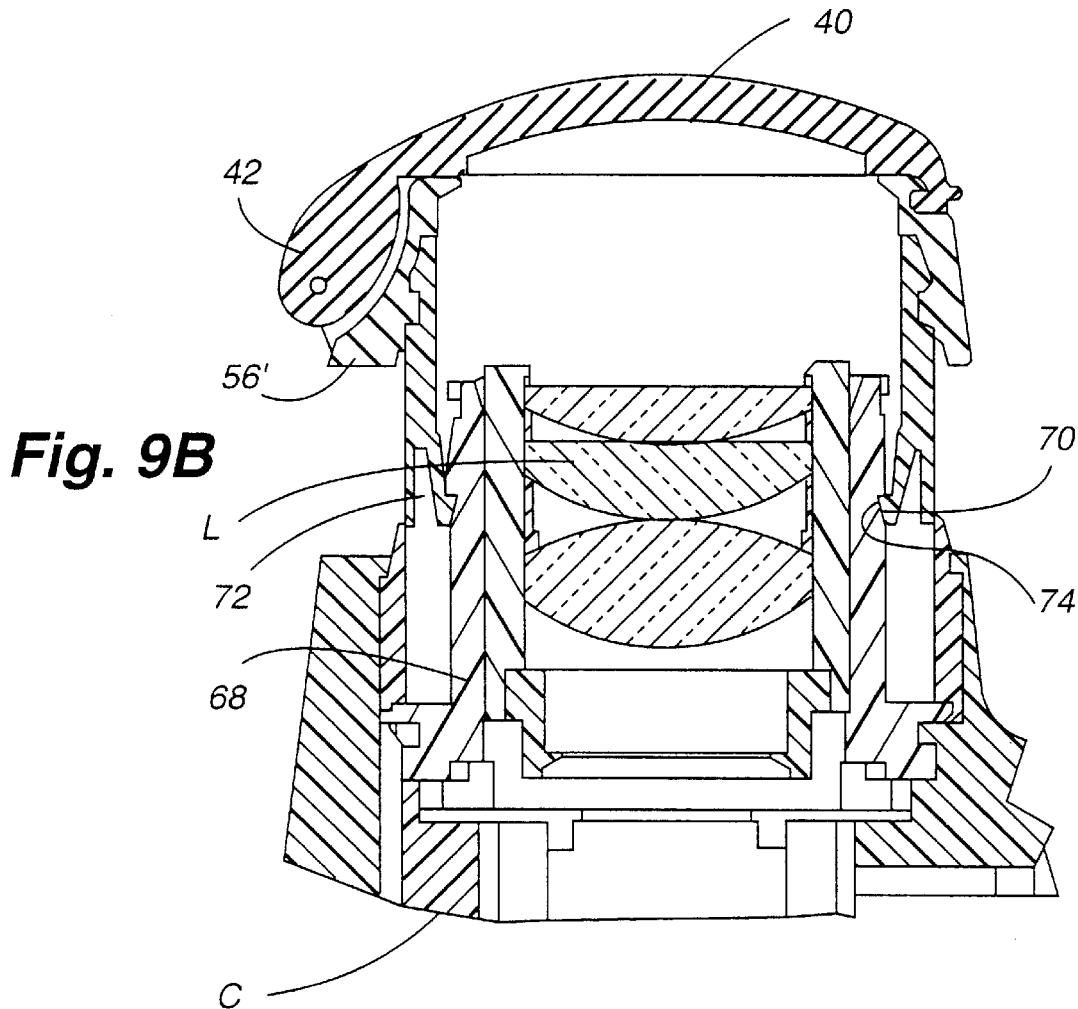
FIG. 9B is a cross sectional view of the apparatus shown in FIG. 9A but with the adjustable sleeve in an extended position.
Figure 10:
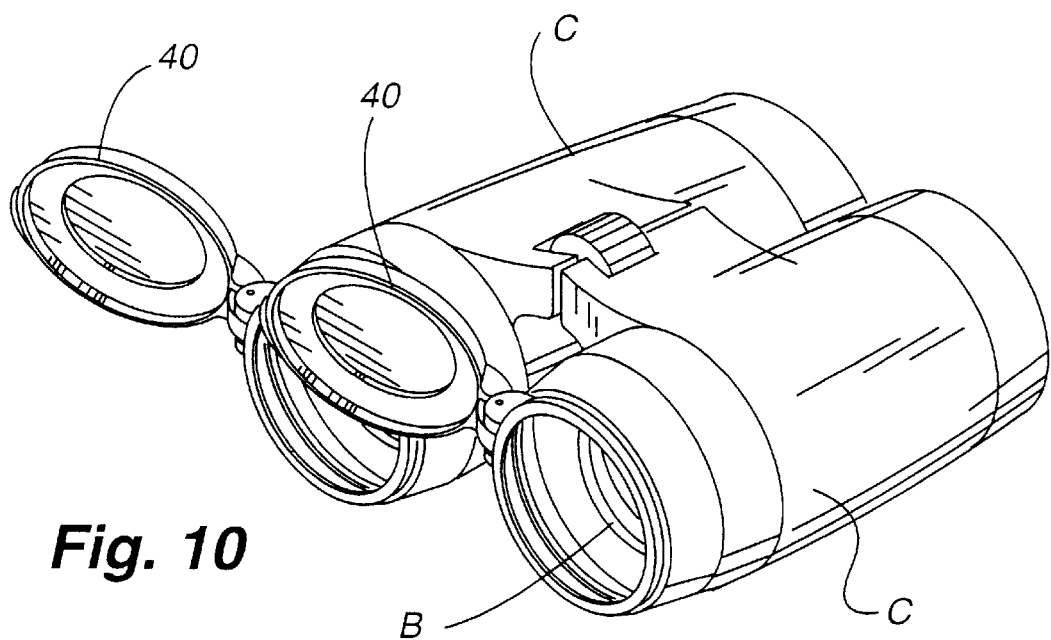
FIG. 10 is perspective view of a pair of binoculars employing the lens cap apparatus of the present invention.

Referring in more detail to the drawings, a preferred form of lens cap apparatus 10 is illustrated in FIGS. 1–10. Briefly, in FIGS. 1–8, the lens cap apparatus 10 is illustrated with a fixed mounting sleeve S mounted on an end of a tubular lens housing H; and FIGS. 8–10 illustrate the lens cap apparatus 10' mounted on an adjustable mounting sleeve S' on the end of the tubular lens housing H'. It is therefore to be understood that the alternate forms of mounting are given more for the purpose of illustration but not limitation.

Referring to FIGS. 1 to 8, the lens cap apparatus 10 includes a base 12 customarily referred to as an eyecup, a lid 40, and the fixed mounting sleeve S which is defined by at least one cap-receiving end 56 of an optical instrument I, such as, a pair of binoculars. When used in connection with a set of binoculars as shown in FIG. 10, each ocular lens of the binoculars contains a separate lens cap apparatus.

The base 12 is of annular configuration and composed of a durable, resilient material, such as, a rubber or a rubber-like material. The base 12 has a top wall 14, a bottom wall 20 and a side wall 24. The top wall 14 has a rim 16, the plane of which is generally perpendicular to the central axis of the base 12. The rim 16 has an inner diameter which forms a circular opening 18 for exposing a lens L of the optical instrument I.

The side wall 22 has an outer surface 24 and an inner surface 30. The outer surface 24 has an upper ledge 26 with a diameter less than the diameter of the outer surface 24 and a notch 28 is positioned perpendicular to the central axis of the base 12 and adjacent to the rim 16. The inner surface 30 has a first ridge 32 and a second ridge 36 which form a first groove 34. The second ridge 36 forms a second groove 38 on the opposite side of the second ridge 36 from the first groove 34.

Figure 1:
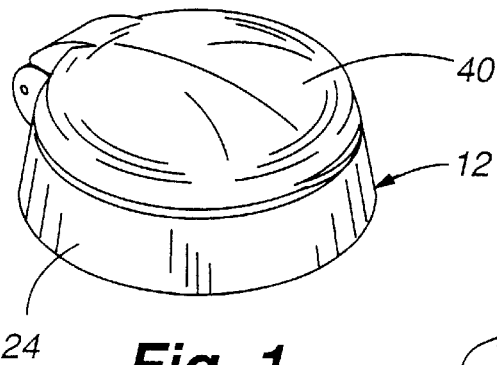
FIG. 1 is a perspective view of the lid and base of the preferred form of lens cap apparatus shown with the lid in a closed position.
Figure 2:
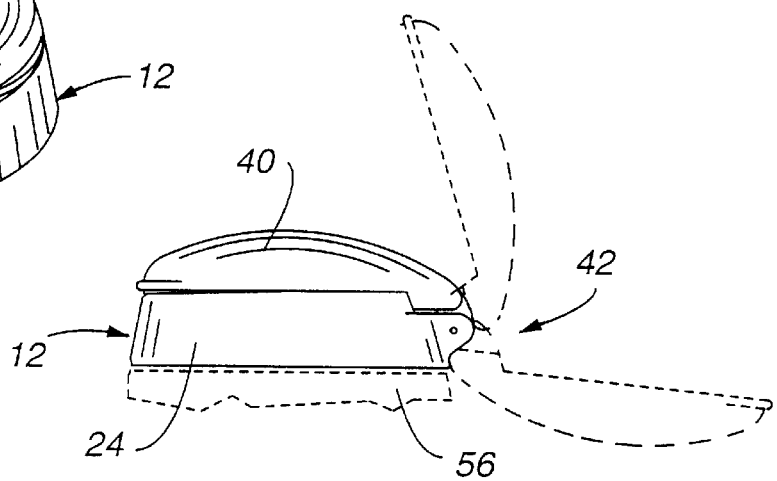
FIG. 2 is a side elevation view of the preferred form of lens cap apparatus and shows the greater than 180° movement of the lid in relation to the base.
Figure 3:
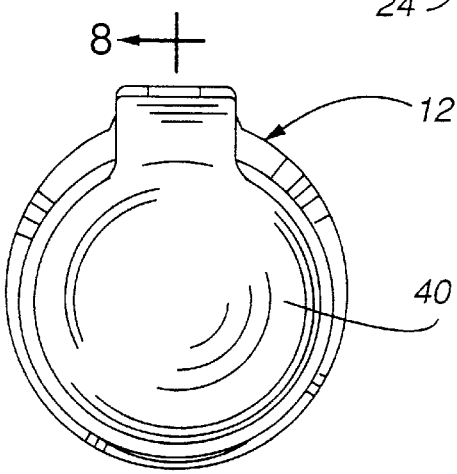
FIG. 3 is a top plan view of the apparatus shown in FIGS. 1 and 2.
Figure 4:
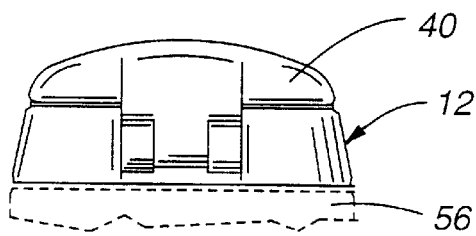
FIG. 4 is rear elevation view thereof.
Figure 5:
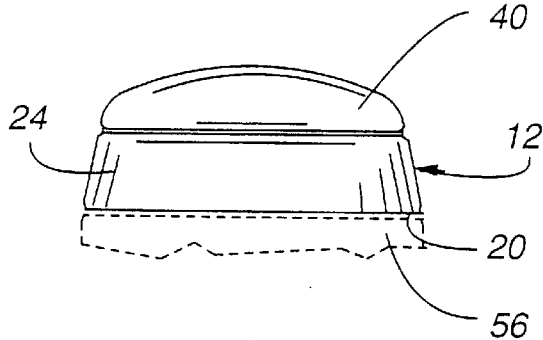
FIG. 5 is a front elevation view thereof.
Figure 6:
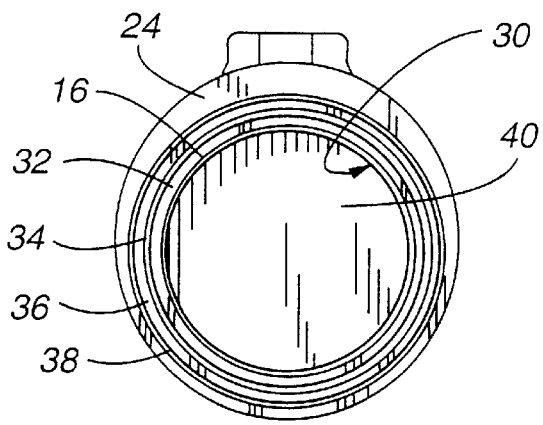
FIG. 6 is a bottom plan view thereof.

The lid 40 is of a generally concavel-convex configuration and composed of a durable, resilient material, such as, rubber or a rubber-like material. As shown in FIG. 1, the lid 40 has a diameter large enough to completely cover the circular opening 18 of the base 12 and to shield the user's eye from incident light. As shown in FIG. 2, a pivotal connector 42, such as, a hinge pivotally connects the lid 40 to the base 12 at a single point along the circumference of the base 12 and the lid 40, thereby permitting greater than 180° movement of the lid 40 from a fully closed position in which the lid 40 covers the circular opening 18, to a fully open position in which the lid 40 is juxtaposed with the base 12. The hinge 42 is located on the opposite side of the base 12 from the notch 28. The lid 40 has an inner concave surface 44, an outer convex surface 48 and a circular edge 50. The edge 50 has an inner diameter slightly larger than the diameter of the upper band 26 of the base 12 thereby forming a weatherproof seal between the lid 40 and base 12 when the lid is in a fully closed position. The edge 50 further contains a radially inward protrusion 54 complementary to the notch 28 for releasably locking the lid 40 and the base 12 into sealed engagement. The protrusion 54 is located on the opposite side of the lid 40 from the hinge 42.

The cap-receiving end 56 is in the form of a fixed mounting sleeve composed of a rigid material, such as, plastic. In the first mounting, as shown in FIG. 8, the cap-receiving end 56 is fixed on at least one end of a tubular lens housing H which retains the lens L of the optical instrument I.

The cap-receiving end 56 contains a connecting means or assembly, such as, a series of circumferential ridges and grooves which are complementary to the circumferential ridges and grooves on the inner surface 30 of the base 12. An upper shoulder 58 of the cap-receiving end 56 mates with ridge 32 of the base 12. A middle ridge 60 on the cap-receiving end, formed between the upper shoulder 58 and a lower groove 62, mates with the second ridge 36 of the base 12. Finally, the lower shoulder 64 on the cap-receiving end mates with the groove 38 of the base 12.

In order to assemble the base 12 onto the cap-receiving end 56, the resilient material of base 12 is stretched to encircle the rigid material of the cap-receiving end 56 and to connect the complementary ridges and grooves, thereby forming a journaled but stable connection between the base 12 and the cap-receiving end 56. This connection in combination with the circular shapes of the base 12 and the cap-receiving end 56 permits 360° rotation of base 12 about cap-receiving end 56. When the user rotates the base 12, the lid 40 is rotated as well. In this way, the user is able to adjust the position of the lid 40 to shield the user's eyes from incident light from many different directions. The greater than 180° movement of the lid 40 in relation to the base 12 further increases the user's ability to completely block all incident light.

Accordingly, in the case of a set of binoculars, a user may separately adjust each lens cap apparatus to shield both of the user's eyes from incident light. Also, when used in connection with binoculars, the greater than 180° movement of the lid 40 allows the user to adjust the lids depending upon the width and shape of the user's head. For example, a user with a wide head will adjust the lids 40 to a more open position than a user with a narrow head.

In a second embodiment of the present invention, as shown in FIG. 9A, 9B, the cap-receiving end 56 is in the form of an annular sleeve adjustably mounted in surrounding relation to a barrel B which houses the lens L of the optical instrument I. The annular sleeve 56 contains at least one arm 64 attached to an inner surface of the sleeve S adjacent to the barrel B on an end of the sleeve S opposite the cap-receiving end 56. The arm 64 is separated from the sleeve S by a V-shaped gap 66 which provides flexibility for the arm 64. The arm 64 terminates in a hook 68 extending towards the barrel B. The barrel B contains a complementary slot 70 to the hook 6, the slot 70 being located on an outer surface of the barrel B adjacent to the sleeve S. The annular sleeve S is slidable with respect to the barrel B such that the cap-receiving end 56 may be retracted close to and extended away from the lens L. When the cap-receiving end 56 of the sleeve S is extended, the hook 68 mates with the slot 70 thereby releasably securing the sleeve S in an extended position. When the sleeve S is retracted, the hook 68 slides along the barrel B until the rim 18 of the base 12 touches the barrel B.

It will be evident from the foregoing that while a preferred form of the invention is herein set forth and which is specifically adaptable for use at that end of the binocular or other scope containing the ocular lens, it is equally conformable for use as a protective cover or cap over the opposite end of the binocular, scope, or other optical instrument.

It is therefore to be understood that the above and other modifications and changes may be made in the lens cap apparatus of the present invention without departing from the spirit and scope of the invention as defined by the appended claims.

I claim:

1. In a lens cap apparatus for an optical instrument wherein said instrument includes a lens housed within a tubular member having a cap-receiving end at least at one end of said tubular member, the improvement comprising:

an annular base disposed in journaled, surrounding relation to said cap-receiving end;

a lid pivotally connected to said base for movement between an open and closed position with respect to said cap-receiving end; and connecting means for securing said base to said cap-receiving end whereby said base and attached lid are rotatable 360° with respect to said cap-receiving end and said lid is adjustable to shield the eye from incident light from any direction.

2. In the apparatus of claim 1 wherein:

said annular base is composed of a durable, resilient material.

3. In the apparatus of claim 1 wherein:

said annular base is composed of a rubber or rubber-like material.

4. In the apparatus of claim 1 wherein:

said annular base defines a lens cap.

5. In the apparatus of claim 1 wherein:

said lid is composed of a durable, resilient material.

6. In the apparatus of claim 1 wherein:

said lid is composed of rubber or a rubber-like material.

7. In the apparatus of claim 1 wherein:

said lid is of a circular shape.

8. In the apparatus of claim 1 wherein:

said lid is of a circular shape having a diameter large enough to completely cover said annular base, thereby forming a protective cover when said lid is in said closed position and a shield for incident light when said lid is in said open position.

9. In the apparatus of claim 1 further including:

a notch on an outer surface of said base, said notch being located on the opposite side of said base from said pivotal connection; and a complementary protrusion located on the circumference of an inner surface of said lid and on an opposite side of said lid from said pivotal connection, said complementary protrusion mating with said notch when said lid is in said closed position thereby releasably securing said lid in said closed position.

10. In the apparatus of claim 1 wherein said connecting means comprises:

at least one ridge and one groove formed from an outer surface of said cap-receiving end; and at least one complementary ridge and one complementary groove formed from an inner surface of said annular base for mating with said ridge and said groove of said cap-receiving end whereby said base is secured to said cap-receiving end while permitting said rotation of said base with respect to said cap-receiving end.

11. In the apparatus of claim 1 wherein said connecting means further includes:

an inner surface of said base having a first ridge and a second ridge forming a first groove, said second ridge forming a second groove on the opposite side of said second ridge from said first groove;

an upper ridge and a lower ridge forming a middle groove on an outer surface of said cap-receiving end, said upper ridge being complementary to said first groove of said base, said middle groove being complementary to said second ridge of said base, and said lower ridge being complementary to said second groove of said base for securing said base to said cap-receiving end and permitting rotation of said base with respect to said cap-receiving end.

12. A lens cap apparatus for an optical instrument comprising:

a base composed of a durable, resilient material and adapted to be releasably connected to said optical instrument, said base being of an annular configuration having a top wall, a bottom wall, and a side wall said top wall forming a rim in an imaginary plane generally perpendicular to a central axis of said base, said rim having an inner diameter which forms a circular opening for exposing a lens of said optical instrument, said side wall having an outer surface and an inner surface, said inner surface having a first ridge and a second ridge forming a first groove, said second ridge forming a second groove on the opposite side of said second ridge from said first groove, said outer surface of said side wall having an upper band, said upper band having a diameter less than the diameter of said outer surface and a notch positioned perpendicular to said central axis and adjacent to said rim of said top wall;

a lid of a generally circular shape and composed of said durable, resilient material, said lid pivotally connected to said base by a hinge, said hinge permitting greater than 180° movement of said lid from a fully closed position wherein said lid covers said circular opening, to a fully open position wherein said lid is juxtaposed with said base, said hinge being located on an opposite side of said base from said notch in said base, said lid having an inner surface, an outer surface, and a side band, said side band having an inner diameter slightly larger than said outer diameter of said upper band of said base thereby forming a weatherproof seal between said lid and said base when said lid in is said fully closed position, said side band having a complementary protrusion to said notch of said base for temporarily locking said sealed connection between said lid and said base, said complementary protrusion being located on the opposite side of said lid from said hinge; and a cap-receiving end on said optical instrument composed of a rigid material and having a generally ring-shaped configuration, said cap-receiving end having an upper ridge and a lower ridge forming a middle groove there between, said upper ridge being complementary to said first groove of said base, said middle groove being complementary to said second ridge of said base, said lower ridge being complementary to said second groove of said base thereby forming a releasable connection between said base and said cap-receiving end, said releasable connection permitting 360° rotation of said base and said lid in relation to said cap-receiving end for blocking incident light from all angles.

13. The lens cap apparatus for an optical instrument of claim 12 wherein:

said lid has a diameter larger than the diameter of said circular opening in said base thereby completely covering said circular opening when said lid is in a closed position and shielding incident light when said lid is in an open position.

14. The lens cap apparatus for an optical instrument of claim 12 wherein:

said cap-receiving end is located on one end of a tubular lens housing of said optical instrument.

15. The lens cap apparatus for an optical instrument of claim 12 wherein:

said cap-receiving end is located on an annular sleeve attached in surrounding relation to a barrel which houses a lens in said optical instrument, said annular sleeve being slidable with respect to said barrel whereby said cap-receiving end may be adjusted in a retracted position close to said lens or in an extended position away from said lens.

16. The lens cap apparatus for an optical instrument of claim 15 further including:

at least one arm attached to said annular sleeve on an inner surface of said sleeve adjacent to said barrel and on an end opposite of said cap-receiving end, said arm being separated from said annular sleeve by a V-Shaped gap for providing flexibility of said arm, said arm terminating in a hook; and a complementary slot to said hook located on an outer surface of said barrel adjacent to said annular sleeve, whereby said hook of said sleeve mates with said complementary slot thereby releasably securing said sleeve in an extended position.

* * * * *